United States Patent [19]

Kobayashi et al.

[11] 4,313,343

[45] Feb. 2, 1982

[54] APPARATUS FOR DETECTING REMAINING QUANTITY OF TONER IN ELECTROPHOTOGRAPHIC COPYING MACHINE

[75] Inventors: Isao Kobayashi; Hideo Akimoto; Yoshiyuki Takahashi; Tokio Hibiya; Masayuki Hata, all of Hachioji, Japan

[73] Assignee: Konishiroku Photo Industry Co., Ltd., Tokyo, Japan

[21] Appl. No.: 59,134

[22] Filed: Jul. 20, 1979

[30] Foreign Application Priority Data

Jul. 24, 1978 [JP] Japan .................................. 53-89489

[51] Int. Cl.[3] ........................ G01F 23/28; G03G 15/00

[52] U.S. Cl. .................................. 73/290 V; 118/694; 355/300

[58] Field of Search ................. 355/3 R, 300; 73/620, 73/624, 627, 290 V; 324/452, 455, 457, 458; 222/DIG. 1; 118/689, 690, 694

[56] References Cited

U.S. PATENT DOCUMENTS

| | | | |
|---|---|---|---|
| 2,709,918 | 6/1955 | Yetter | 73/627 X |
| 2,799,157 | 7/1957 | Pohlman | 73/624 X |
| 3,223,964 | 12/1965 | Stadlin | 73/290 V X |
| 3,859,846 | 1/1975 | Asada et al. | 73/627 X |
| 4,133,453 | 1/1979 | Ohbora | 222/DIG. 1 |
| 4,159,786 | 7/1979 | Biddle et al. | 73/290 V X |
| 4,174,902 | 11/1979 | Hamaguchi | 355/3 DD |

*Primary Examiner*—Fred L. Braun

*Attorney, Agent, or Firm*—Bierman & Bierman

[57] ABSTRACT

An apparatus for detecting the amount of toner in the supply hopper of an electrophotographic copying machine includes a transmitting element in the hopper for generating an ultrasonic acoustic wave and a receiving element in the hopper in operative relation to the transmitting element for receiving the ultrasonic acoustic wave reflected from toner in the hopper, the magnitude of the reflected wave being representative of the level of toner contained in the hopper.

7 Claims, 12 Drawing Figures

APPARATUS FOR DETECTING REMAINING QUANTITY OF TONER IN ELECTROPHOTOGRAPHIC COPYING MACHINE

BACKGROUND OF THE INVENTION

1. Field of the Invention

The present invention relates to an apparatus for detecting a remaining quantity of toner in an electrophotographic copying machine.

2. Description of the Prior Art

In general, in the case of a dry type electrophotographic copying machine in which a developer of a two-component system consisting of carrier particles and toner particles is used, the toner contained in the developer is progressively consumed in accordance with the copying operation. In view of this fact, an automatic toner supplementing device is provided so as to maintain the toner density or concentration in a predetermined range. However, in case the toner contained within a hopper of the toner supplementing device is completely exhausted, the supplementary toner supply or addition to the developer can not be effected, whereby the toner concentration in the developer is reduced, resulting in correspondingly degraded image quality of the replica. In order to prevent such undesirable phenomenon from occurring, it is necessary to provide a detection and alarm system for detecting when the quantity of toner remaining in the supply hopper is decreased below a predetermined level and then signalling to the attendant the necessity of supplementing the toner to the hopper.

However, most of the hitherto known electrophotographic copying machines are lacking in the provision of such detection and alarm system. As a consequence, the operator or attendant is liable for periodical inspection and supplementary supply of the toner, which is however actually often neglected.

SUMMARY OF THE INVENTION

Accordingly, an object of the present invention is to eliminate the inconvenience of the prior art electrophotographic copying machine.

In view of the above and other objects which will become more apparent as this description proceeds, there is provided according to an aspect of the invention apparatus for detecting a remaining quantity of toner in an electrophotographic copying machine, characterised in that the apparatus comprises an ultrasonic wave transmitting element disposed within a toner supply source container for supplying toner to a developing station, an ultrasonic wave receiving element disposed within the toner supply source container in combination with the ultrasonic wave transmitting element, and means for responding to the output signal from the ultrasonic wave receiving element thereby to detect the level of toner within the toner supply source container.

In the following, the invention will be described in detail by referring to the accompanying drawings.

DETAILED DESCRIPTION OF THE PREFERRED EMBODIMENTS

Figure 1:
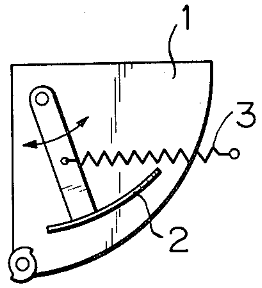
FIG. 1 PRIOR ART
FIG. 1 illustrates schematically an arrangement of a hitherto known remaining toner quantity detecting device.

FIG. 1 illustrates schematically an arrangement of a hitherto known detecting device. In this figure, reference numeral 1 denotes a hopper in which an agitating plate 2 is swingably supported by means of a lever having an upper end portion pivotally connected to the inner wall of the hopper 1. The agitating plate 2 is biased under tension of the return spring 3. In the prior art system of the arrangement outlined above, the detection of the quantity of remaining toner in the supply container or hopper 1 is accomplished on the basis of the fact that the magnitude of the swinging movement of the agitating plate 2 within the hopper 1 which is balanced by the load corresponding to the toner weight and the biasing force of the spring 3 both applied to the agitating plate 2 will vary in dependence on the quantity of toner remaining in the hopper 1. Accordingly, by sensing the magnitude of the swinging or pivotal movement of the lever in the spring-biased state with the aid of a photoelectric array and processing the signal thus obtained in an appropriate manner, it is possible to detect the remaining toner quantity. However, such detecting system usually requires a high accuracy in the spring bias and adjustments for every unit to disadvantages.

Figure 2:
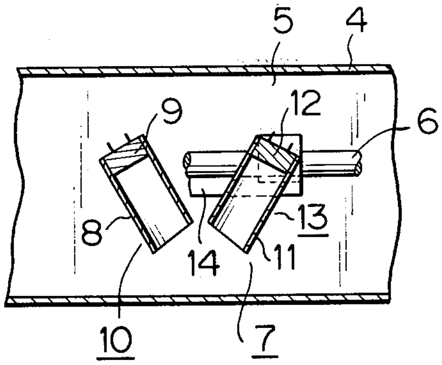
FIG. 2 illustrates a general arrangement of a remaining toner quantity detecting apparatus according to an embodiment of the invention.
Figure 3:
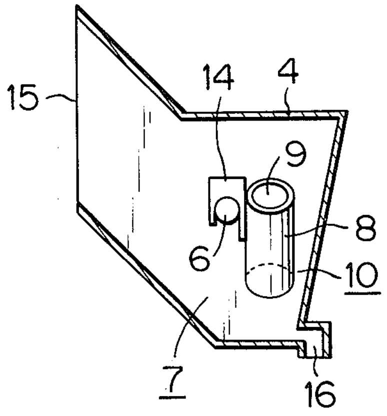
FIG. 3 is a schematic side view of the same.

With a view to obviating the drawbacks of the prior art detecting system, according to an embodiment of the invention, a remaining toner quantity detecting device denoted generally by numeral 7 is provided as supported by a stay 6 within a toner supply container or hopper 5 defined in a main body of a toner supply apparatus 4, as is illustrated in FIGS. 2 and 3.

Although the stay 6 is used as the mounting means for the detecting device in the case of the illustrated embodiment, it will be readily appreciated that the detecting device 7 can be supported by any other suitable means known in the art.

The remaining toner quantity detecting device 7 according to the invention comprises on the one hand an ultrasonic wave transmitting element 10 constituted by a sound guide tube 8 having an open lower end and a closed upper end which is plugged by an ultrasonic generator (microphone) 9, and on the other hand an ultrasonic receiving element 13 constituted by a sound guide tube 11 having an opened lower end and a closed upper end plugged by a microphone 12 for receiving the ultrasonic wave. Both the sound guide tubes 8 and 11 are mounted on the stay member 6 in a V-like orientation relative to each other by means of respective brackets 14.

In FIG. 3 reference numeral 15 denotes a toner supplementing chute, and 16 designates a toner chute extending to a developing device (not shown).

Figure 4:
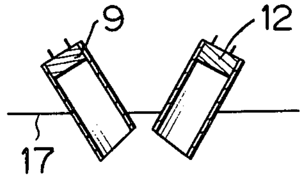
FIGS. 4 and 5 illustrate positional relationships between a sound wave transmitting element and a receiving element as used according to the teaching of the invention.
Figure 5:
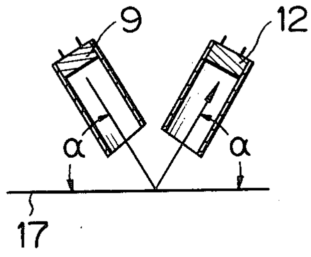

With the arrangement of the remaining toner quantity detecting system described above, when the lower open ends of the sound guide tubes 8 and 11 are immersed in a pool 17 of toner particles as illustrated in FIG. 4, the ultrasonic energy generated by the transmitting microphone 9 will be damped significantly by the toner mass before being received by the receiving microphone 12. In contrast, when the lower open ends of the sound guide tubes 8 and 11 are exposed exteriorly from the toner layer as illustrated in FIG. 5, the ultrasonic energy emitted by the transmitting element 10 is reflected by the upper surface of the toner layer and thus picked up by the receiving microphone 12 with a high input level. In this manner, it is possible to detect when the quantity of toner is decreased below a predetermined level as a function of input level of the sound energy picked up by the receiving microphone 12.

Figure 6:
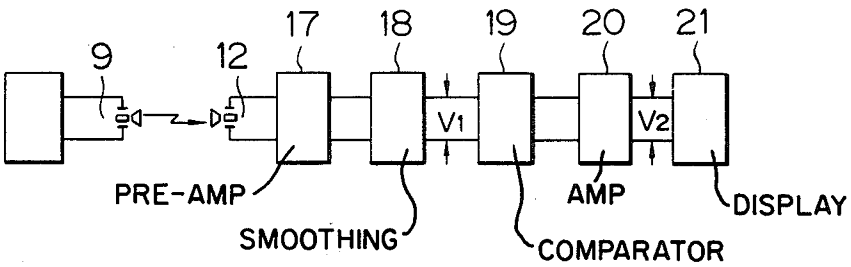
FIG. 6 is a block diagram of a toner level detecting circuit according to the invention.

Referring to FIG. 6 which shows a block diagram of a circuit for processing the output signal from the receiving microphone 12, the sound signal of a predetermined frequency received by the receiving microphone 12 is, after having been amplified by a pre-amplifier circuit 17, supplied to a smoothing circuit 18 to be converted into a D.C. voltage signal $V_1$ which is then applied to an input terminal of a comparator circuit 19 having a reference voltage applied to the other input terminal (not shown). When the voltage signal $V_1$ is higher than the reference voltage, the output signal from the comparator is at a high level and otherwise at a low level (or vice-versa). The output signal $V_2$ from the comparator 19 (the output signal $V_2$ is designated as an output of an amplifier circuit 20 in the figure) is amplified by an amplifier circuit 20 to actuate a display device 21. The predetermined frequency of the sound signal is selected to be out of the acoustic range, e.g. at 40 KHz, so as not to be disturbing.

Figure 7:
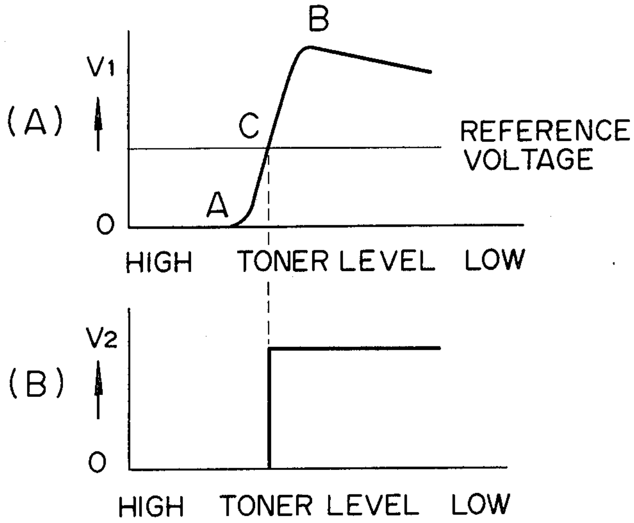
FIGS. 7(A) and 7(B) illustrate operational characteristic curves of the toner level detector circuit.

FIGS. 7(A) and 7(B) illustrate graphically relationships between the toner level and the output voltage signals $V_1$, $V_2$. At a point A shown in FIG. 7(A), the upper peripheral edges of the lower open ends of both sound guide tubes 8 and 11 coincide with the toner level, whereby the receiving microphone 12 begins to receive the sound signal energized from the transmitting microphone 9 described hereinbefore. The point B at which the output signal voltage $V_1$ becomes maximum represents that condition in which the intersection of the axes of the sound guide tubes 8 and 11 lies on the toner surface. When the toner level is further lowered, the output voltage $V_1$ will be also lowered progressively. At the point C, the output voltage $V_1$ coincides with the reference voltage, whereupon the output voltage $V_2$ from the comparator is changed over to the high level from the low level.

When the microphones used for the transmitting and the receiving elements exhibit a high directivity to the sound wave, it is preferred that the respective sound wave guide tubes are positioned with an angle $\alpha$ relative to the toner surface for detecting the level of the remaining toner quantity, where the angle $\alpha$ is selected in a range of $0° \leqq \alpha \leqq 90°$. The optimum angular value may be selected so that no jamming of toner particles at the lower open ends of the sound wave guide may occur thereby to assure a desirable detection voltage characteristic.

Figure 8:
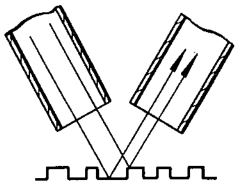
FIGS. 8 to 11 illustrate interferences between reflected waves and means for obviating the adverse influence of such interference.
Figure 9:
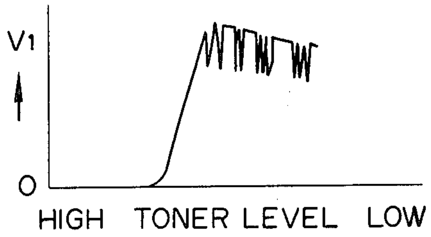
Figure 10:
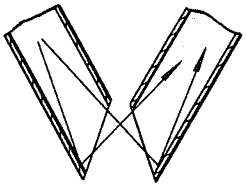
Figure 11:
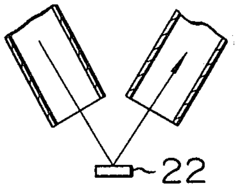

The height of the toner level within the hopper 5 will become lower with continuing toner supplying operations. Further, the surface state of the remaining toner pool will vary in dependence on the mechanical operation such as the actuation of the agitating plate (not shown). As a consequence, when there arises a half-wave length difference between the propagation paths for the sound wave reflected at a concave surface portion and the sound wave reflected at a convex surface portion as illustrated in FIG. 8, the output voltage $V_1$ may be decreased due to the interference between those reflections, as is shown in FIG. 9. In order to obviate the influence of such interference, the lower open end of each of the wave guides should be slanted and arrayed in a manner shown in FIG. 10 so that the receiving microphone picks up the sound waves from the transmitting microphone reflected at the inner surface of the tapered lower end portions of the wave guides. Then, the maximum output voltage $V_1$ max can be increased thereby to compensate for decreasement thereof due to the interference. A similar effect can be attained by a reflecting plate 22 (FIG. 11) mounted on the base plate (not shown) of the toner container or a hopper 5 in the vicinity of the intersection point between the axes of the transmitting and the receiving wave guides.

The advantages provided by the present invention may be enumerated as follows:

(a) Because the toner level per se is detected, no adverse influence is exerted on the detecting accuracy due to mechanical factors and variations in environmental conditions.

(b) No adjustment is required upon assembling the detecting system in the toner supplementary supply apparatus.

(c) Since neither movable parts nor consumption elements are employed, a high reliability in operation as well as a long useful life can be attained.

(d) Due to the use of sound energy in the ultrasonic range, no audible noises are produced.

(e) The detection system can be adopted for measuring the level of pulverized materials other than the toner particles for a dry type copying machine.

(f) Since the ultrasonic transmitting element and the ultrasonic receiving element are disposable in a V-like orientation relative to each other in a toner container, detection of the toner level lying below those elements can be attained.

What we claim is:

1. Apparatus for detecting the level of particulate toner contained in a toner supply hopper of an electrophotographic copying machine so as to enable toner replenishment to the hopper when the level recedes to a predetermined point, said apparatus comprising:

transmitting means disposed in the toner hopper for generating an ultrasonic acoustic wave;

receiving means disposed in the toner hopper and in operative relation to said transmitting means for receiving the wave generated by said transmitting means after reflection from toner contained in the hopper and for producing a signal in representative accordance with the received wave; and circuit means connected to said receiving means for converting said signal into an indication of the level of toner contained in the hopper, said transmitting and receiving means being so disposed in the hopper that the toner contained therein covers at least a portion of said transmitting and receiving means when the level of toner is at a maximum and said transmitting and receiving means are uncovered when the level of toner has receded to the predetermined point for replenishment.

2. Apparatus for detecting the level of particulate toner in accordance with claim 1, said operative relation of the transmitting and receiving means comprising a substantially V-configured relative orientation thereof.

3. Apparatus for detecting the level of particulate toner in accordance with claim 1, each of said transmitting and receiving means including a hollow guide tube for guiding the transmitted and received ultrasonic acoustic waves, respectively.

4. Apparatus for detecting the level of particulate toner in accordance with claim 3, each of the hollow guide tubes of said transmitting and receiving means having a slanted open end for facilitating guidance of the transmitted and received ultrasonic acoustic waves, respectively.

5. Apparatus for detecting the level of particulate toner in accordance with claim 1, said apparatus further comprising a reflector plate disposed on a fixed interior surface of the toner hopper in the path of the transmitted ultrasonic acoustic wave for increasing the intensity of the reflected wave.

6. Apparatus for detecting the level of particulate toner in accordance with claim 1, said transmitting means comprising a hollow tube open at opposite ends thereof and a transmitting element closing one end of the tube for emitting an ultrasonic acoustic wave guidedly through the tube toward the opposite tube open end for emission therefrom, and said receiving means comprising a second hollow tube open at opposite ends and a receiving element closing one end of the tube for receiving an ultrasonic acoustic reflected wave entering said second tube through its opposite open end and guided through the second tube to said receiving element.

7. Apparatus for detecting the level of particulate toner in accordance with claim 6, said opposite open end of each of said hollow tubes being covered by particulate toner when the toner level is at said maximum and uncovered when the toner level has receded to said predetermined point for replenishment.

* * * * *